May 5, 1953        I. M. STEIN        2,637,619
MULTIRANGE RECORDER INDICATOR
Filed Feb. 23, 1949        2 SHEETS—SHEET 1
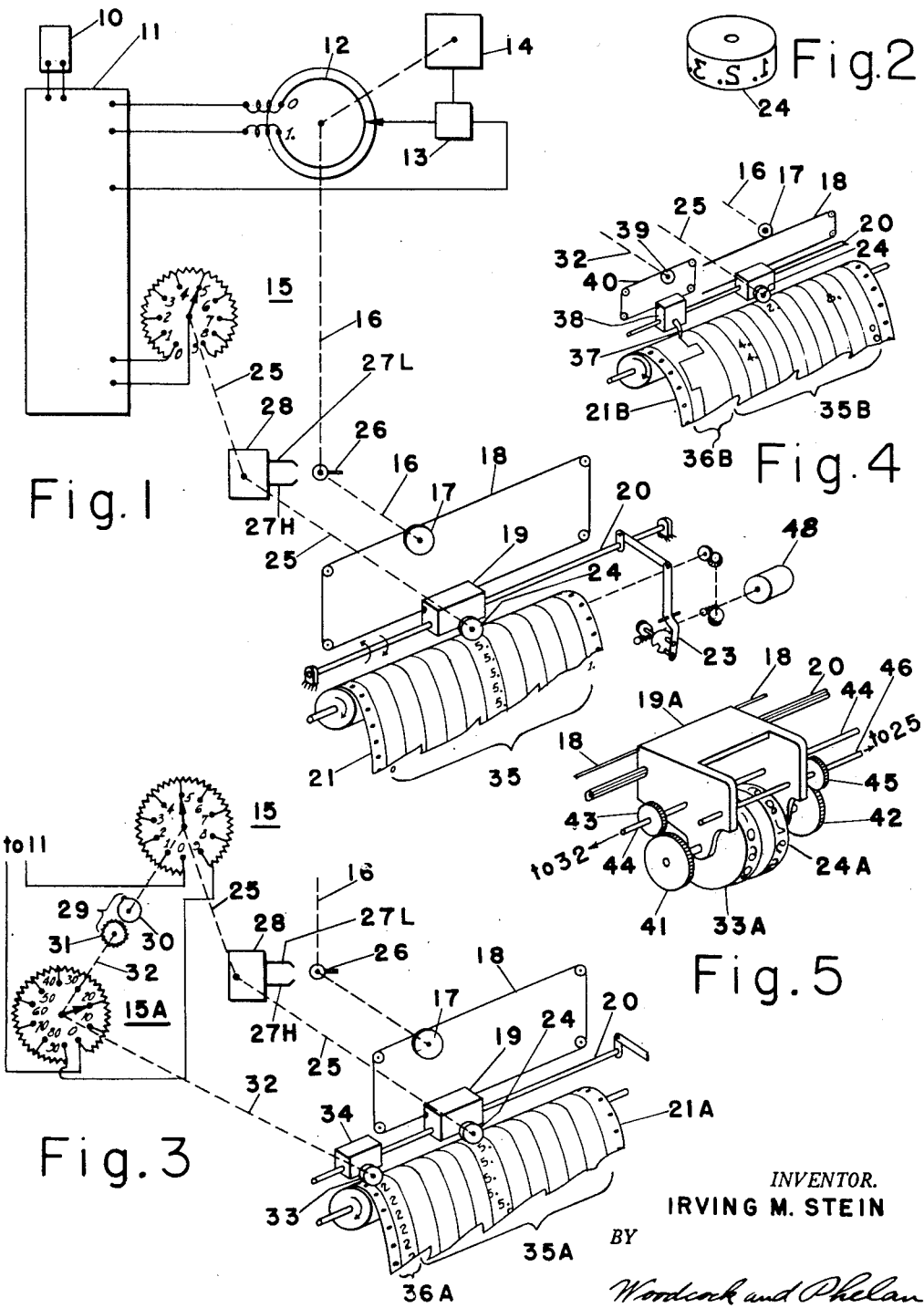
INVENTOR.
IRVING M. STEIN
BY
Woodcock and Phelan
ATTORNEYS May 5, 1953  I. M. STEIN  2,637,619
MULTIRANGE RECORDER INDICATOR
Filed Feb. 23, 1949  2 SHEETS—SHEET 2
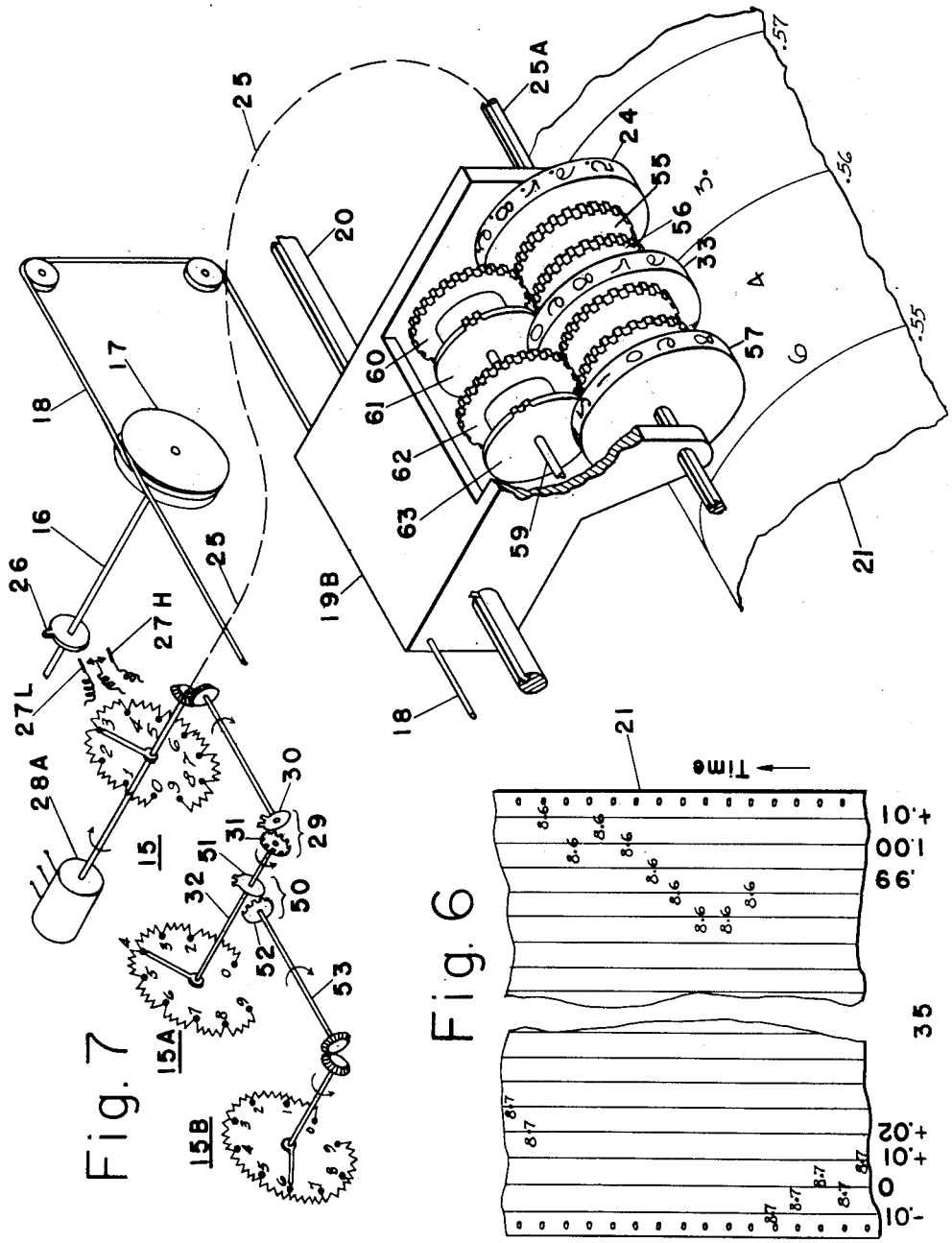
INVENTOR.
IRVING M. STEIN
BY
Woodcock and Phelan
ATTORNEYS Patented May 5, 1953

2,637,619

UNITED STATES PATENT OFFICE 2,637,619

MULTIRANGE RECORDER INDICATOR

Irving M. Stein, Philadelphia, Pa., assignor to Leeds and Northrup Company, Philadelphia, Pa., a corporation of Pennsylvania Application February 23, 1949, Serial No. 77,742

16 Claims. (Cl. 346—32)

This invention relates to self-balancing measuring systems for recording or indicating the variations in magnitude of resistance, temperature, pressure, ion-concentration or other variable physical, electrical or chemical condition.

Usually in recorders of the null, self-balancing type, the recorder scale corresponds with the range of measurement and the carriage for the associated pen or equivalent recording member is positioned across the scale in correspondence with the balance settings of the slidewise or equivalent balancing element of the measuring system or network. With such simple arrangement, it is not possible to obtain the precision required for many applications of recording instruments. For any given total range of measurement, the accuracy with which the variable may be read from the chart may be increased by providing one or more "range" impedances adjustable to vary the measuring range of the recorder by increments or steps each equal to or somewhat less than the range of the slidewire.

The present invention is particularly concerned with arrangements for converting the settings of the slidewire and of the one or more stepped range impedances to recorded information on the chart and in form which is easily and precisely readable. In general, the recording member is not only positioned across the chart scale, as has been briefly described, but is in the form of a print wheel mechanically coupled to an automatically stepped range impedance so that the characters printed or indicated by the wheel correspond with range settings and the positions of the printed characters on the chart correspond with slidewire settings. When two or more range impedances are used, they may be interconnected by counter mechanisms and coupled to the corresponding printing elements in any of the various ways hereinafter described: in the preferred arrangement, all of the print wheels are coaxially mounted upon the "pen" carriage and are interconnected by counter mechanisms thus to afford convenient interpretation of the record and optimum utilization of the chart space for the slidewire scale.

The invention further resides in recording systems and apparatus having the features of construction, combination and arrangement hereinafter described and claimed.

For a more detailed understanding of the invention and for illustration of various improvements thereto, reference is made to the accompanying drawings in which:

Fig. 1 schematically illustrates a self-balancing recorder system having a single range impedance;

Fig. 2 is a perspective view of a print wheel;

Fig. 3 schematically illustrates, in part, a recorder system having two range impedances and print wheels;

Fig. 4 illustrates a modification of Fig. 3 in which the second range print wheel is replaced by a pen or stylus;

Fig. 5 is a perspective view of a multi-print wheel carriage arrangement;

Fig. 6 is an explanatory figure referred to in discussion of the operation of Fig. 5; and Fig. 7 schematically illustrates another modification having coaxially mounted print wheels on the "pen" carriage.

Referring to Fig. 1, the block 10 is generically representative of an element for producing an electrical effect varying in accordance with the magnitude of a condition under measurement; for example, it may be a resistor varied in response to changes in level of a liquid; a resistor having a temperature coefficient of resistance for measurement of temperature; a thermocouple for producing a voltage varying as a function of temperature or of received radiation; a pH cell for producing a voltage varying with ion-concentration; or any other primary measuring element used in the art of electrical measurements. The block 11 is generically representative of a measuring network such as a Wheatstone bridge, a potentiometer or similar balanceable network. The slidewire 12 is generically representative of a balancing element of the network 11 which is adjustable in obtaining null response of a suitable detector generically represented by the block 13. When the network is unbalanced, due to change in the magnitude of the variable to which the primary element 10 is responsive, the detector 13 responds to control rebalancing mechanism represented by block 14 which effects adjustment of slidewire 12 or equivalent, in proper sense and to proper extent to rebalance the network 11. As shown in Squibb Patent No. 1,935,732, the detector 13 may be a galvanometer and the self-balancing mechanism 14 may comprise clutch mechanism controlled by feelers which engage the galvanometer needle. Alternatively, for high speed recording, the detector 13 and rebalancing mechanism 14 may comprise, as in Williams Patent No. 2,113,164, a thermionic amplifier and an electric motor controlled thereby.

Regardless of the specific form of the measuring network and of the rebalancing arrangement therefor, the settings of the slidewire 12 or equivalent balancing element are indicated by "pen" carriage 19 to which the adjustable element of the slidewire is mechanically coupled as by shaft 16, pulley 17 thereon and the cord 18. The carriage 19 is slidable along the guide shaft 20 across the record sheet or strip chart 21 which is continuously fed past the path of the carriage by motor 48 or equivalent timing mechanism.

At suitably short intervals, the shaft 20 is rocked to effect engagement between printing element 24, carried by carriage 19, and the record chart 21. The mechanism 23 for deriving this rocking motion of shaft 20 from motor 48 may be of the type specifically upon and described in Ross et al. Patent No. 2,113,748.

With the recorder thus far described, the series of marks printed by element 24 define a curve showing the successive balance settings of slidewire 12. However, for precise measurement, the measuring range of slidewire 12 is selected to be a small fraction of the total range of measurement jointly afforded by slidewire 12 and by the stepped range impedance 15 and accordingly it may be necessary from time to time to adjust impedance 15 to bring the balance point of the network within the range of adjustment of the slidewire.

Automatically to effect such stepping adjustment, it is provided that as the slidewire approaches one or the other limit of its range, pin 26 or equivalent element secured to the slidewire-shaft 16 engages one or the other of control members 27L, 27H to initiate one or more cycles of operation of motor device 28 to effect one or more steps of adjustment of the range impedance 15. Various suitable arrangements for effecting step-by-step adjustments of the range impedance 15 are disclosed in copending application Serial No. 50,638, filed September 22, 1948. The incremental change of the measuring range effected for each step of adjustment of impedance 15 preferably corresponds with or is slightly less than the total range of slidewire 12. Accordingly, when the measured variable changes to such extent that network 11 cannot be rebalanced within the range of adjustment of slidewire 12, the magnitude of impedance 15 is automatically changed until the network can be balanced by adjustment of slidewire 12.

To record the settings of impedance 15, the recording element 24 is in the form of a print wheel (Fig. 2) mechanically coupled to the adjustable element of impedance 15 by shaft 25 or equivalent. The symbols or characters angularly spaced about the periphery of the print wheel may simply identfy the "range" settings or may be numbers corresponding with the summation of the impedance steps in use. Preferably, each of the printed symbols includes a reference mark or dot to provide a definite point for exact reading of the slidewire position from the chart scale 35. The chart scale 35 may have 100 clearly distinguishable divisions so that the position of the slidewire 12 can be directly read to at least two significant figures and the number printed by the wheel 24 provides an additional significant figure. The particular arrangement shown in Fig. 1 using a single decade-point resistor, effectively multiples the width of the record chart by ten with corresponding increase in the precision of recording.

Furthermore, with the arrangement described, the composite record of the range settings and slidewire positions may easily be interpreted from a single trace in which the value and position of each printed character indicate respectively the positions or settings of the range resistor and the slidewire.

When, as indicated in Fig. 3, the measuring network includes two range resistors 15, 15A, their adjustable elements should be interconnected by suitable type of counter-mechanism 29 such as a Geneva train, so designed that each time impedance 15 is adjusted directly from its maximum to its minimum value, or vice versa, the impedance 15A is increased, or decreased, by one step corresponding with maximum value of impedance 15.

As indicated in Fig. 3, the counter-mechanism 29 may comprise a mutilated gear 30 connected by a shaft to the adjustable element of impedance 15 which once per revolution advances the drive gear 31 of the counter through an angle corresponding with one step of adjustment of impedance 15A. With the two-decade network, there are one hundred successive measuring ranges each corresponding in extent with the range of slidewire 12. Figs. 3, 4 and 5 show three specifically different arrangements for so recording the variable that, with a 100 division chart, the variable may be read directly to 0.01 per cent.

In the particular arrangement shown in Fig. 3, the settings of the second range impedance 15A are effectively transferred to the record sheet 21A by a second print wheel 33 having a series of angularly spaced characters corresponding with the number of settings of impedance 15A. The print wheel 33 is rotatably mounted on a fixed carriage 34 which may be secured to the rock-shaft 20 in position to overlie marginal zone 36A of the record sheet. The print wheel 33 is mechanically coupled to shaft 32 of the adjustable element of impedance 15A so that the successive characters printed in zone 36A permanently record the successive settings of the second range impedance 15A. As carriages 19, 34 simultaneously move into engagement with the record sheet for each rocking movement of shaft 20, each of the numbers successively printed in the narrow marginal zone 36A has a mate printed on the same "time" line and within the limits of the extended scale 35A.

As indicated in Fig. 3, the series of characters which appear in zone 36A to indicate the setting or value of impedance 15A are in alignment in the narrow marginal zone 36A, whereas the series of characters printed by wheel 24 identify the settings of impedance 15 and trace the successive positions of slidewire 12 within the limits of the scale 35A.

In telemetering of heights as of liquid in tanks, it may be desirable to record in feet, inches and fractions of an inch. In such case, the range impedance 15 would have twelve settings and corresponding print wheel 24 would be numbered from zero to 11 inclusive; the range impedance 15A would have sufficient number of steps for the maximum height in feet to be recorded and each step would correspond with the total range afforded by slidewire 12 and range impedance 15. Thus, the readings in marginal zone 36A would be directly in feet, the numbers appearing in the zone 35A would be in integral inches and the positions of the latter numbers with respect to the chart scale would be directly readable in fractions of an inch.

In the arrangement shown in Fig. 4, the step-by-step movement of the "second" range impedance is transmitted by pulley 39 and cord 40 to a second carriage 38 slidable along the rockshaft 20. The pen or stylus 37 attached to the carriage 38 records the various settings of impedance 15A in the marginal zone 36B of the record sheet 21B. The record may be a continuous line, as shown, or it may be a succession of dots, depending upon whether or not the carriage 38 is or is not keyed to shaft 29. The arrangement shown in Fig. 4 is less desirable than that of Fig. 3 as the marginal zone 36B must be widened with consequent narrowing of the slidewire scale 35B. In brief, the chart width allocated to zone 36B must be sufficiently wide clearly to distinguish between, for example, ten different settings of impedance 15A whereas the marginal zone 36A of Fig. 3 need be only slightly wider than one printed symbol.

By mounting both of the print wheels upon the "pen" carriage, as in Fig. 5, there is no need for any marginal zone, such as 36A of Fig. 3 or 36B of Fig. 4, and, consequently, substantially the entire width of the recorder chart may be used for the slidewire scale, Fig. 6. More specifically, the print wheels 24A and 33A, Fig. 5, are adjacently and coaxially mounted upon the carriage 19A with their common axis parallel of the shaft 20. The print wheel 24A is connected to gear 42 which is continually in mesh with gear 45 slidably keyed to shaft 46 and mounted, by means not shown, for movement with the carriage. The shaft 46 slidably extends through the carriage 19A and at one end or the other is suitably connected to shaft 25 from the range impedance 15 so that the angular position of the print wheel 24A corresponds with the setting of impedance 15.

In like manner, the second print wheel 33A is connected for rotation with gear 41 which is in continuous mesh with gear 43 slidably keyed to shaft 44 and movable with carriage 19A. Shaft 44 freely extends through the carriage 19A and at one end or the other is suitably connected to shaft 32 from the second range impedance 15A. Thus the print wheel 33A indicates the settings of the second range impedance.

As the carriage 19A is coupled to the slidewire 12, it will be appreciated that each time the shaft 20 is rocked, the position of the slidewire is indicated by the location on scale 35 of the printed dot, Fig. 6, and the printed numbers adjacent the dot indicate the respective settings of the two range resistors. Thus it is most convenient directly to read the measured values and with less likelihood of error because all the measuring information obtained at a particular time appears at one place on the chart. As immediately evident from inspection of Fig. 6, the varying magnitude of the measured condition may easily be read to four significant figures.

Preferably, the measuring range of the slidewire is slightly greater than the range afforded by an individual step of the range impedance 15. Specifically and as indicated in Fig. 6, the slidewire range may extend from —.01 to 1.01 instead of from 0 to 1.00 times the lowest range step. In consequence, the slidewire 12 and the range resistor 15 are not repeatedly stepped back and forth for small fluctuations of the measured condition near either limit of the slidewire range as it otherwise would. Assuming that the chart, Fig. 6, is moving downward and that the condition in falling from 87.02 to 86. fluctuates about 87.00, the range impedance 15 is not stepped from the "7" to the "6" setting until the measured value falls to 86.99 which is printed as 87. at minus .01 on the chart and not as 86. at .99 on the chart. For continued falling below 86.99, the range impedance 15 is stepped to the "6" point and the following reading 86. is near and below the 1.00 point of the scale. Similarly when the measured condition is rising, the range impedance 15 is not stepped to the next higher point setting until 86. is above the 1.01 point of the slidewire scale 35; specifically referring to Fig. 6, as the measured value rises and fluctuates about 87.00, the measuring impedance 15 is not stepped to the "7" point until the measured magnitude exceeds 87.01: i. e., the values between 87. and 87.01 if printed appear as 86. between 1.00 and 1.01 on the chart. For rise of the measured condition somewhat above 87.01, the impedance 15 is stepped to the "7" point and the symbols are printed on the left of the chart but to the right of plus 0.01.

When for still greater precision of measurement, the number of range impedances is increased to three or more, the arrangements shown in Figs. 3, 4 and 5 are not well suited for recording their settings either because of need to shorten the slidewire scale (Figs. 3, 4) or of the mechanical complexities encountered in driving the print wheels from their corresponding range impedances (Fig. 5). When two or more range impedances are to be used, the preferred arrangement is that of Fig. 7.

In general, the range impedances are coupled or interconnected by counter mechanisms; the corresponding print wheels are also coupled by counter mechanisms, and a single drive shaft or equivalent couples the print wheel train to the range impedance train. More specifically for the three-decade arrangement shown in Fig. 7, the first range impedance 15 is coupled by shaft 25, or equivalent, to the first print wheel 24 as in the preceding modifications. Print wheel 24 drives the second print wheel 33 through a counter-mechanism comprising gear 60, continuously in mesh with gear 55 which is fastened to wheel 24, and mutilated gear 61 rotatable as a unit with gear 60 and adapted to engage gear 56 fastened to print wheel 33. This counter-mechanism is synchronized with counter-mechanism 29 which interconnects range impedances 15 and 15A. Consequently each time the range impedance 15A is stepped to a higher or lower setting by its counter-mechanism 29, the corresponding print wheel 33 is stepped to the next higher or lower number by its counter-mechanism 60, 61. The shaft 25 transmits the power for effecting the stepping adjustments of both print wheels 24 and 33 to indicate the settings of impedances 15 and 15A as symbols or numbers printed side by side on the record sheet 21.

The next higher range impedance 15B is coupled to range impedance 15A by a counter-mechanism 50 whose mutilated driving gear 51 is moved in unison with the adjustable element of impedance 15A. As the adjustable element of impedance 15A is directly stepped from its highest to lowest point, or vice versa, the gear 51 engages gear 52 to move the adjustable element of impedance 15B to its next higher or next lower step as the case may be. Concurrently with this stepping adjustment of impedance 15B by motor 28A through the counter train 29, 50 the shaft 25 transmits power to step the third print wheel 57 to the corresponding setting through the counter-mechanism 60, 61 previously described and a similar counter-mechanism 62, 63 interposed between print wheels 33 and 57. It shall be understood the first print wheel 24 is slidably keyed to a keyway in shaft 25A which extends through the "pen" carriage 19A whereas the additional print wheels 33, 57 are free to rotate thereon.

In brief resume of Fig. 7, the position of carriage 19B continuously corresponds with the successive balance settings of the slidewire 12 (Fig. 1) and the angular positions of the print wheels 24, 33, 57, coaxially mounted on the carriage, at all times respectively correspond with the existing settings of the range impedances 15, 15A, 15B. As in Fig. 1, and other previously described modifications, the stepping adjustments of the range impedances and of the print wheel or wheels may be effected by motor 28A under control of limit switches actuated by arm 26, or equivalent actuator, moved in synchronism with the slidewire 12.

As apparent from Fig. 7, with the three-decade arrangement the recorded variable may directly be read to five significant figures, the printed dot indicating the point for reading from the slidewire scale for the two lower significant figures and the printed numbers or characters directly indicating or corresponding with the numerical values of the variable to three higher significant figures.

The arrangement shown in Fig. 7 may also be used as an indicator in which case the numbers on the wheels 24, 33 and 57 are not inverted or reversed and the scale for carriage 19B is fixed: a pointer, not shown, would be attached to carriage 19B to cooperate with the scale in indication of the slidewire position. In self-balancing measuring systems in which the settings of the rebalancing slidewire 12 are not of great interest, the carriage 19B may be a stationary support for wheels 24, 33, 57 in which event they would indicate the settings of range impedances 15, 15A, 15B as automatically effected under control of the rebalancing slidewire.

From the foregoing it shall be understood the invention is not limited to the specific embodiments particularly disclosed and described and that modification and changes may be made within the scope of the appended claims.

What is claimed is:

1. A system for precisely recording varying magnitudes of a condition on a movable record chart comprising a balanceable network, two impedances adjustable to balance said network, one of said impedances being adjustable step-by-step to provide contiguous measuring ranges within each of which the other of said impedances is smoothly adjustable to effect precise balance for magnitudes of said condition within each of said ranges, a rotatable printing member having angularly spaced range symbols, mechanical coupling means from said stepped impedance to said printing member to effect corresponding angular adjustments thereof, mechanical coupling means from said smoothly adjustable impedance to said printing member to effect corresponding linear movement thereof with respect to said chart, and means intermittently operated to effect repeated engagement between said movable record chart and said printing member as adjusted by both of said coupling means whereby each impression of the printing member on the chart indicates concurrent settings of said balancing impedances.

2. A system for precisely recording varying magnitudes of a condition on a movable record chart comprising a balanceable network, a range-impedance included in said network and adjustable step-by-step to provide contiguous measuring ranges, a second adjustable impedance included in said network and smoothly adjustable to effect balance of said network for magnitudes of said condition within each of said contiguous ranges, a rotatable printing member having angular spaced range symbols, coupling means for effecting angular adjustments of said printing member in correspondence with steps of adjustment of said range impedance, coupling means for moving said printing member with respect to said chart to positions corresponding with the adjustments of said second impedance, and means intermittently operated to effect engagement between said chart and said printing member to produce a succession of printed symbols, the varying position of successive symbols on the chart indicating the variation of said condition within the contiguous ranges identified by the symbols.

3. A system for recording varying magnitudes of a condition on a movable record chart comprising a balanceable network, at least two range impedances included in said network and each adjustable step-by-step to provide contiguous measuring ranges, range-printing members for engaging adjacent portions of said chart, and coupling means interconnecting said range impedances and said printing members to effect a step-by-step adjustment of said printing members each in accordance with the stepping adjustment of a corresponding range impedance.

4. A system for recording the varying magnitudes of a condition on a movable record chart comprising a balanceable network, range impedances included in said network and each adjustable step-by-step to provide contiguous measuring ranges, range-printing members for engaging adjacent portions of said chart, and coupling means interconnecting said range impedances and said printing members to effect a step-by-step adjustment of said printing members each in accordance with the stepping adjustment of a corresponding range impedance, said coupling means including counter-mechanisms each between adjacent range impedances and mechanical connections each individual to a range impedance and its corresponding printing member.

5. A system for recording the varying magnitudes of a condition on a movable record chart comprising a balanceable network, range impedances included in said network and each adjustable step-by-step to provide contiguous measuring ranges, range-printing members for engaging adjacent portions of said chart, and coupling means interconnecting said range impedances and said printing members to effect step-by-step adjustment of said printing members each in accordance with the stepping adjustment of a corresponding range impedance, said coupling means including counter-mechanisms between the range impedances, counter-mechanisms between said printing members and a direct driving connection between one of said range impedances and one of said printing members.

6. A multi-range recorder comprising an adjustable element for rebalancing a measuring system, a movable carriage, a print wheel rotatably mounted upon said carriage for rotation in either of two directions and having angularly spaced range symbols, operating means for moving said carriage and the print wheel with respect to the chart of said recorder to positions corresponding with the adjustments of said rebalancing element within its limits of adjustment, and step-by-step mechanism including structure actuated upon adjustments of said rebalancing element to either limit of its range of adjustment to rotate said print wheel in corresponding direction to the next range symbol.

7. A multi-range recorder comprising an adjustable element for rebalancing a measuring system, a movable carriage, print wheels coaxially rotatably mounted upon said carriage each for rotation in either of two directions, counter-mechanism interconnecting said print wheels, operating means for moving said carriage and print wheels as a unit to positions corresponding with adjustments of said rebalancing element within its limits of adjustment, and step-by-step mechanism including structure operated upon adjustment of said rebalancing element to either of its limits directly to actuate one of said print wheels in corresponding direction and to actuate the other of said print wheels upon predetermined number of successive operations in the like direction.

8. A recorder for precise recording of the varying magnitudes of a condition upon a record chart having a wide scale and a marginal zone comprising a balanceable network, means for balancing said network to follow changes in magnitude of said condition comprising impedances adjustable step-by-step and a smoothly continuously adjustable impedance, counter-mechanism interconnecting said step-by-step impedances, actuating means responsive to adjustment of said smoothly adjustable impedance to either limit of its range of adjustment directly to effect a step adjustment of one of said stepped impedances, a carriage mechanically coupled to said smoothly adjustable impedance for movement across said chart scale, a printing member rotatably mounted on said carriage and mechanically coupled to said one of said stepped impedances, and a second printing member positioned adjacent said marginal chart zone and mechanically coupled to the other of said stepped impedances.

9. A system for precise recording of the varying magnitudes of a condition upon a record chart having a wide scale and a marginal zone comprising a balanceable network, means for balancing said network to follow changes in magnitude of said condition comprising impedances adjustable step-by-step and a smoothly continuously adjustable impedance, counter-mechanism interconnecting said step-by-step impedances, actuating means responsive to adjustment of said smoothly adjustable impedance to either limit of its range of adjustment directly to effect a step adjustment of one of said stepped impedances, two carriages respectively movable across said scale and said zone, printing members respectively fixedly and rotatably mounted on said carriages, means mechanically coupling one of said carriages to said smoothly adjustable impedance, means mechanically coupling the other of said carriages to one of said stepped impedances, and means mechanically coupling the other of said stepped impedances to said rotatably mounted printing member.

10. A recorder system for precise recording of the varying magnitudes of a condition upon a record chart having a wide scale and a marginal zone comprising a balanceable network, means for balancing said network to follow changes in magnitude of said condition comprising impedances adjustable step-by-step and a smoothly continuously adjustable impedance, counter-mechanism interconnecting said step-by-step impedances, actuating means responsive to adjustment of said smoothly adjustable impedance to either limit of its range of adjustment directly to effect a step adjustment of one of said stepped impedances, two carriages respectively movable across said scale and said zone, printing members respectively fixed and rotatably mounted on said carriages, means mechanically coupling one of said carriages to said smoothly adjustable impedance, means mechanically coupling the other of said carriages to one of said stepped impedances, means mechanically coupling the other of said stepped impedances to said rotatably mounted printing member, and mechanism for intermittently rocking said carriages to effect engagement of said printing members with said record chart.

11. A system for precise recording of the varying magnitudes of a condition upon a record chart having a wide scale and a marginal zone comprising a balanceable network, means for balancing said network to follow changes in magnitude of said condition comprising impedances adjustable step-by-step and a smoothly continuously adjustable impedance, counter-mechanism interconnecting said step-by-step impedances, actuating means responsive to adjustment of said smoothly adjustable impedance to either limit of its range of adjustment directly to effect a step adjustment of one of said stepped impedances, a carriage movable across said scale, a fixed carriage positioned adjacent said zone, print wheels respectively rotatably mounted on said carriages, means mechanically coupling said movable carriage to said smoothly adjustable impedance, and means respectively mechanically coupling said stepped impedances to said print wheels.

12. A system for precise recording of the varying magnitudes of a condition upon a record chart having a wide scale and a marginal zone comprising a balanceable network, means for balancing said network to follow changes in magnitude of said condition comprising impedances adjustable step-by-step and a smoothly continuously adjustable impedance, counter-mechanism interconnecting said step-by-step impedances, actuating means responsive to adjustment of said smoothly adjustable impedance to either limit of its range of adjustment directly to effect a step adjustment of one of said stepped impedances, a carriage movable across said scale, a fixed carried positioned adjacent said zone, print wheels respectively rotatably mounted on said carriages, means mechanically coupling said movable carriage to said smoothly adjustable impedance, and mechanism for intermittently rocking said carriages in unison to effect engagement of said print wheels with said record chart.

13. A system for precise recording of the varying magnitudes of a condition upon a record chart comprising a balanceable network, means for balancing said network to follow changes in magnitude of said condition comprising impedances adjustable step-by-step and a smoothly continuously adjustable impedance, counter-mechanism interconnecting said step-by-step impedances, actuating means responsive to adjustment of said smoothly adjustable impedance to either limit of its range of adjutsment directly to effect a step adjustment of one of said stepped impedances, a carriage movable across said chart and mechanically coupled to said smoothly adjustable impedance, print wheels rotatably mounted on said carriage, and means respectively mechanically coupling said print wheels to said stepped impedances.

14. A condition for precise recording of the varying magnitudes of a condition upon a record chart comprising a balanceable network, means for balancing said network to follow changes in magnitude of said condition comprising impedances adjustable step-by-step and a smoothly continuously adjustable impedance, counter-mechanism interconnecting said step-by-step impedances, actuating means responsive to adjustment of said smoothly adjustable impedance to either limit of its range of adjustment directly to effect a step adjustment of one of said stepped impedances, a carriage movable across said chart and mechanically coupled to said smoothly adjustable impedance, print wheels rotatably mounted on said carriage, counter-mechanism interconnecting said print wheels, and means mechanically coupling one of said print wheels to one of said stepped impedances for actuation of said print wheels to settings corresponding with the settings of said stepped impedances.

15. An electromechanical system suited for recording or indicating the varying magnitudes of a condition comprising a balanceable measuring network, a slidewire adjustable in balancing of said network, range impedances included in said network and each adjustable step-by-step to provide contiguous measuring ranges, counter-mechanism interconnecting said range impedances, coaxially mounted range wheels each having angularly spaced range symbols, counter-mechanism interconnecting said range wheels, and means responsive to adjustment of said slidewire to either limit of its range for effecting step-by-step adjustment of said impedances and synchronous step-by-step adjustment of said range wheels.

16. A multi-range measuring instrument comprising a balanceable measuring network including a slidewire adjustable in balancing of said network and at least one range impedance adjustable step by step, a range wheel for each range impedance having angularly spaced range symbols respectively corresponding with its steps, means responsive to unbalance of said network for effecting rebalancing adjustment of said slidewire, and means responsive to adjustment of said slidewire to either limit thereof for effecting a synchronized step adjustment of a range wheel and corresponding range impedance.

IRVING M. STEIN.

References Cited in the file of this patent

UNITED STATES PATENTS

| Number | Name | Date |
|---|---|---|
| 1,768,966 | Tanner | July 1, 1930 |
| 2,113,069 | Ross et al. | Apr. 5, 1938 |
| 2,392,916 | Gruss | Jan. 15, 1946 |
| 2,401,019 | Rieber | May 28, 1946 |
| 2,476,025 | Clark | July 12, 1949 |

FOREIGN PATENTS

| Number | Country | Date |
|---|---|---|
| 266,798 | Great Britain | Feb. 28, 1927 |